US011222164B2

(12) United States Patent
Pedersen et al.

(10) Patent No.: US 11,222,164 B2
(45) Date of Patent: Jan. 11, 2022

(54) ADDING CUSTOM CONTENT TO AN EXISTING DOCUMENTATION SUITE

(71) Applicant: International Business Machines Corporation, Armonk, NY (US)

(72) Inventors: Stacy Pedersen, Whitby (CA); Kevin Doyle, Whitby (CA)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 16/691,851

(22) Filed: Nov. 22, 2019

(65) Prior Publication Data

US 2021/0157973 A1 May 27, 2021

(51) Int. Cl.
| | | |
|---|---|---|
| *G06F 17/10* | (2006.01) | |
| *G06F 40/166* | (2020.01) | |
| *G06Q 10/10* | (2012.01) | |
| *G06F 40/106* | (2020.01) | |
| *G06F 16/901* | (2019.01) | |
| *G06F 9/445* | (2018.01) | |

(52) U.S. Cl.
CPC ............ *G06F 40/166* (2020.01); *G06F 9/445* (2013.01); *G06F 16/901* (2019.01); *G06F 40/106* (2020.01); *G06Q 10/10* (2013.01)

(58) Field of Classification Search
CPC .... G06F 40/166; G06F 40/106; G06F 16/901; G06F 9/445; G06Q 10/10
See application file for complete search history.

(56) References Cited

U.S. PATENT DOCUMENTS

| | | | | | |
|---|---|---|---|---|---|
| 5,574,898 | A | * | 11/1996 | Leblang | G06F 11/3476 |
| 5,873,097 | A | * | 2/1999 | Harris | G06F 16/2308 |
| 10,324,696 | B2 | * | 6/2019 | Bhat | G06F 8/60 |
| 10,534,671 | B1 | * | 1/2020 | Zhao | G06F 8/63 |
| 2002/0144255 | A1 | * | 10/2002 | Anderson | G06F 8/71 |
| | | | | | 717/174 |
| 2002/0145614 | A1 | * | 10/2002 | Van Valer | G06F 16/51 |
| | | | | | 345/629 |
| 2003/0046681 | A1 | * | 3/2003 | Barturen | G06F 8/71 |
| | | | | | 717/177 |
| 2005/0015762 | A1 | * | 1/2005 | Steckler | G06F 8/71 |
| | | | | | 717/176 |

(Continued)

FOREIGN PATENT DOCUMENTS

| | | |
|---|---|---|
| CN | 101529419 B | 5/2013 |
| WO | 2011067785 A3 | 9/2011 |
| WO | WO-2018224243 A1 * | 12/2018 .......... G06F 21/577 |

OTHER PUBLICATIONS

Sibal, "12 Best Examples of Product Documentation and Help Guides," Documentor, Mar. 2017, 12 pages.
"Uploading knowledge," BMC Software, Inc., 2005, 4 pages.

*Primary Examiner* — Shahid K Khan
(74) *Attorney, Agent, or Firm* — VanLeeuwen & VanLeeuwen; Alexander G. Jochym (57) ABSTRACT

An approach is provided in which the approach receives a set of unchangeable product documentation corresponding to a product that is unalterable by a user. The approach converts a set of user content received from the user into a format compatible with the set of unchangeable product documentation, and integrates the formatted set of user content with the set of unchangeable product documentation into a user interface. The approach displays the user interface on a display.

14 Claims, 8 Drawing Sheets

(56) References Cited

U.S. PATENT DOCUMENTS

| | | | | |
|---|---|---|---|---|
| 2005/0096937 A1* | 5/2005 | Subash | ............... | G06F 8/10 |
| | | | | 717/104 |
| 2007/0239760 A1* | 10/2007 | Simon | ............... | G06Q 10/06 |
| 2012/0324377 A1* | 12/2012 | Allington | ............. | G06F 8/38 |
| | | | | 715/763 |
| 2013/0117668 A1* | 5/2013 | Joseph | .............. | G06F 9/453 |
| | | | | 715/708 |
| 2013/0174122 A1* | 7/2013 | Watters | ............. | G06F 8/36 |
| | | | | 717/121 |
| 2013/0174124 A1* | 7/2013 | Watters | ............. | G06F 8/71 |
| | | | | 717/122 |
| 2014/0047332 A1* | 2/2014 | Liu | .................. | G06F 40/169 |
| | | | | 715/273 |
| 2014/0115459 A1* | 4/2014 | Norwood | ........ | G06F 3/0482 |
| | | | | 715/708 |
| 2015/0254713 A1* | 9/2015 | Brewer | .............. | G06F 9/453 |
| | | | | 705/14.54 |
| 2017/0207963 A1* | 7/2017 | Mehta | ............ | H04L 41/0896 |
| 2017/0264684 A1* | 9/2017 | Spillane | ......... | H04L 67/1095 |
| 2017/0300634 A1* | 10/2017 | Chiang | ............ | G16H 10/60 |

* cited by examiner

ADDING CUSTOM CONTENT TO AN EXISTING DOCUMENTATION SUITE

BACKGROUND

Product development consists of developing a product and creating support product documentation. In computer hardware and software product development, product documentation describes the product to its users and includes installation instructions, operational instructions, product technical manuals, and etcetera. Businesses typically provide product documentation as a fully functioning online website that allows a user to interactively search, provide comments/questions, and etcetera.

At times, a user accesses product documentation using a fully hosted offline product documentation suite. A fully hosted offline product documentation suite is an offline (e.g., no Internet connection) fully functioning website that is interactive with table of contents, search, and etcetera. The user may download the fully hosted offline product documentation suite from a business website or the fully hosted offline product documentation suite may be embedded as part of a product that a user has installed.

BRIEF SUMMARY

According to one embodiment of the present disclosure, an approach is provided in which the approach receives a set of unchangeable product documentation corresponding to a product that is unalterable by a user. The approach converts a set of user content received from the user into a format compatible with the set of unchangeable product documentation, and integrates the formatted set of user content with the set of unchangeable product documentation into a user interface. The approach displays the user interface on a display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
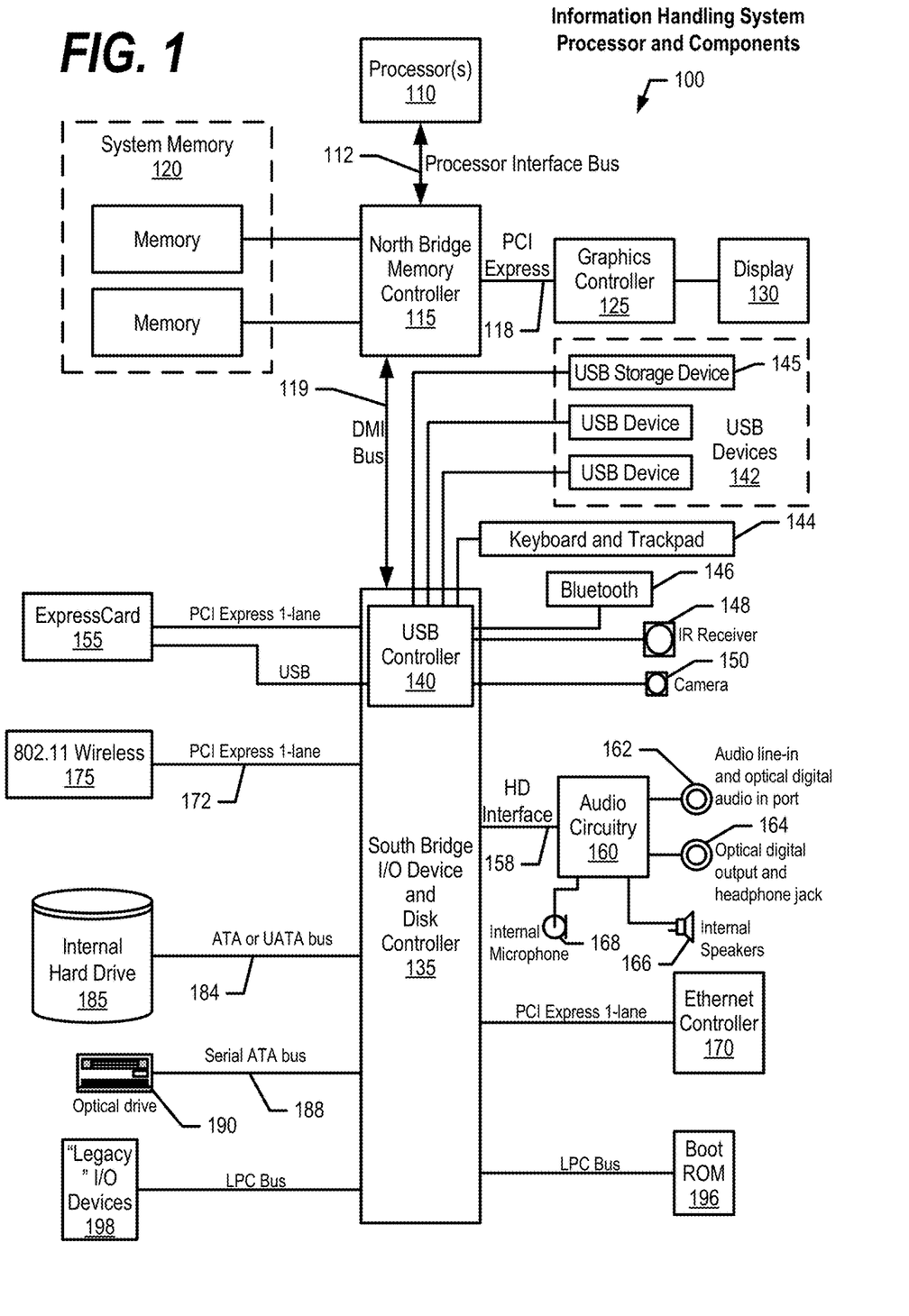
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, and etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
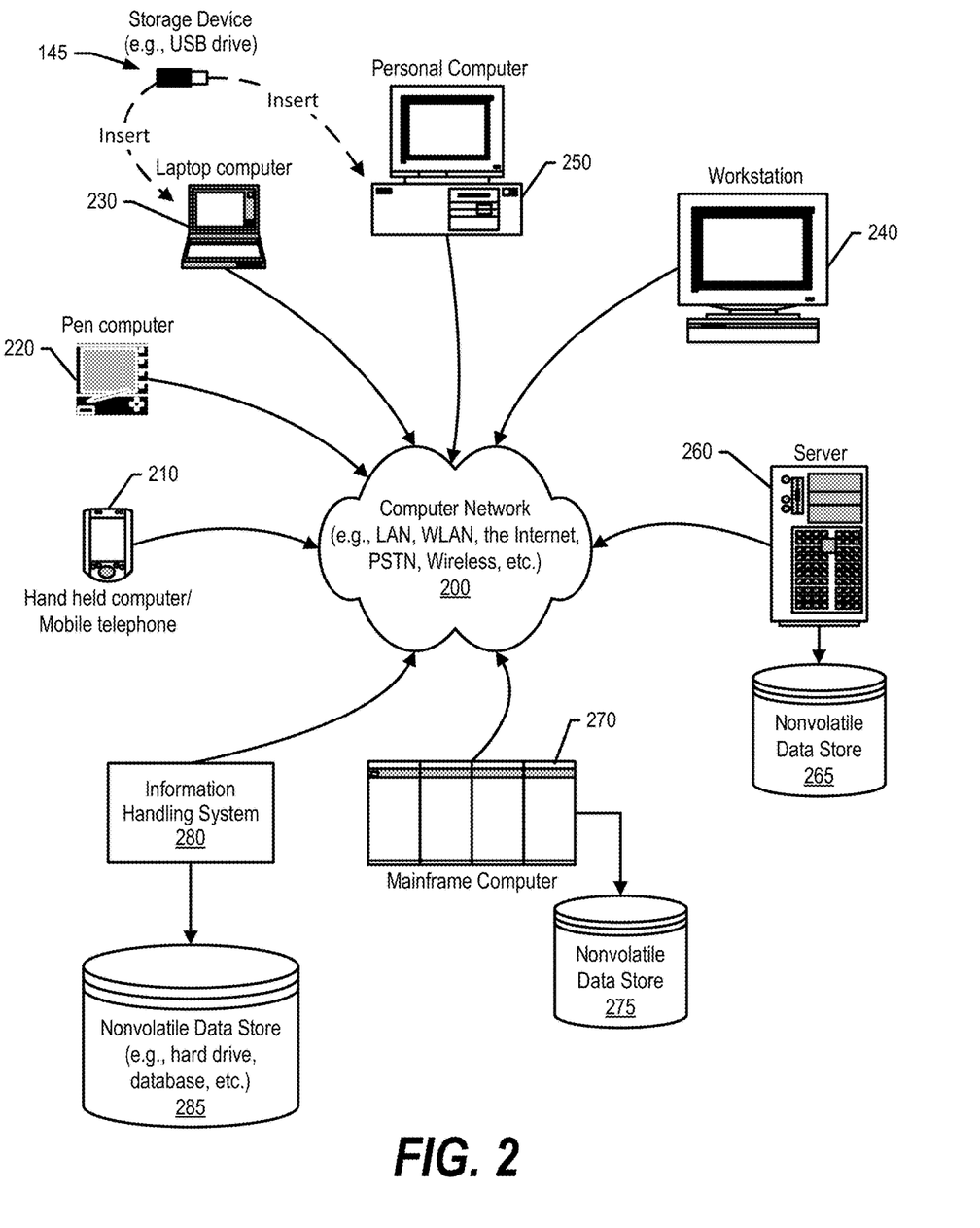
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, a user may utilize a fully hosted offline product documentation suite to access product information. In addition to the product documentation supplied with a product, a user may also wish to create custom content (documentation topics) that includes specific information corresponding to an established product's documentation suite. For example, a user may wish to create documentation that describes specific steps for their security procedures or for developing their own applications or workloads. A challenge found with existing implementations, however, is that the existing implementations do not provide a user with an ability to integrate their own custom documentation topics into a fully hosted offline documentation suite. As a result, the user's custom content is separate from the offline documentation suite and difficult for the user to maintain and utilize.

Figure 3:
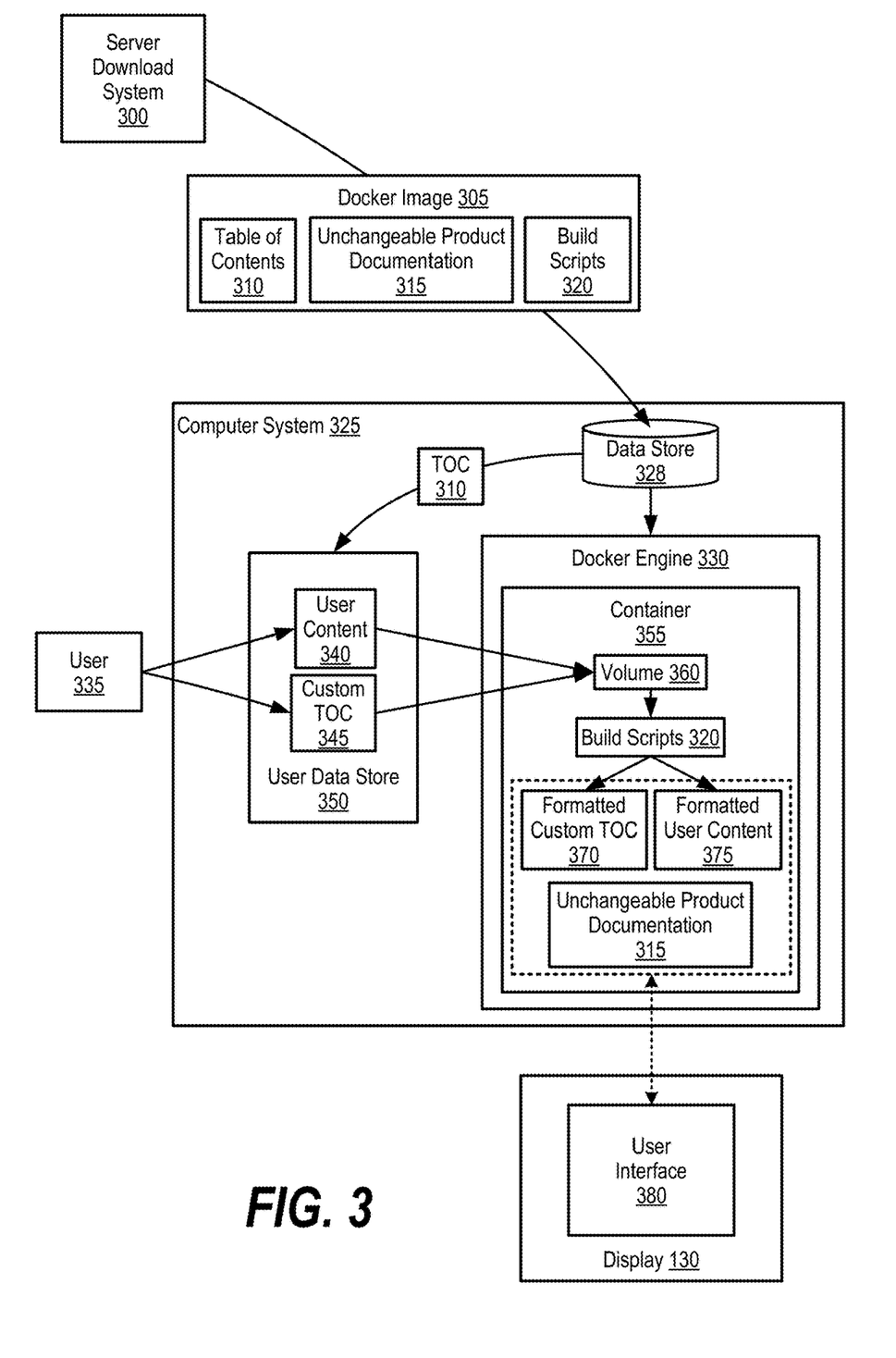
FIG. 3 is an exemplary diagram showing a computer system using a Docker-based embodiment to create a customized user interface that includes unchangeable product documentation, a formatted user content, and a formatted custom table of contents.
Figure 4:
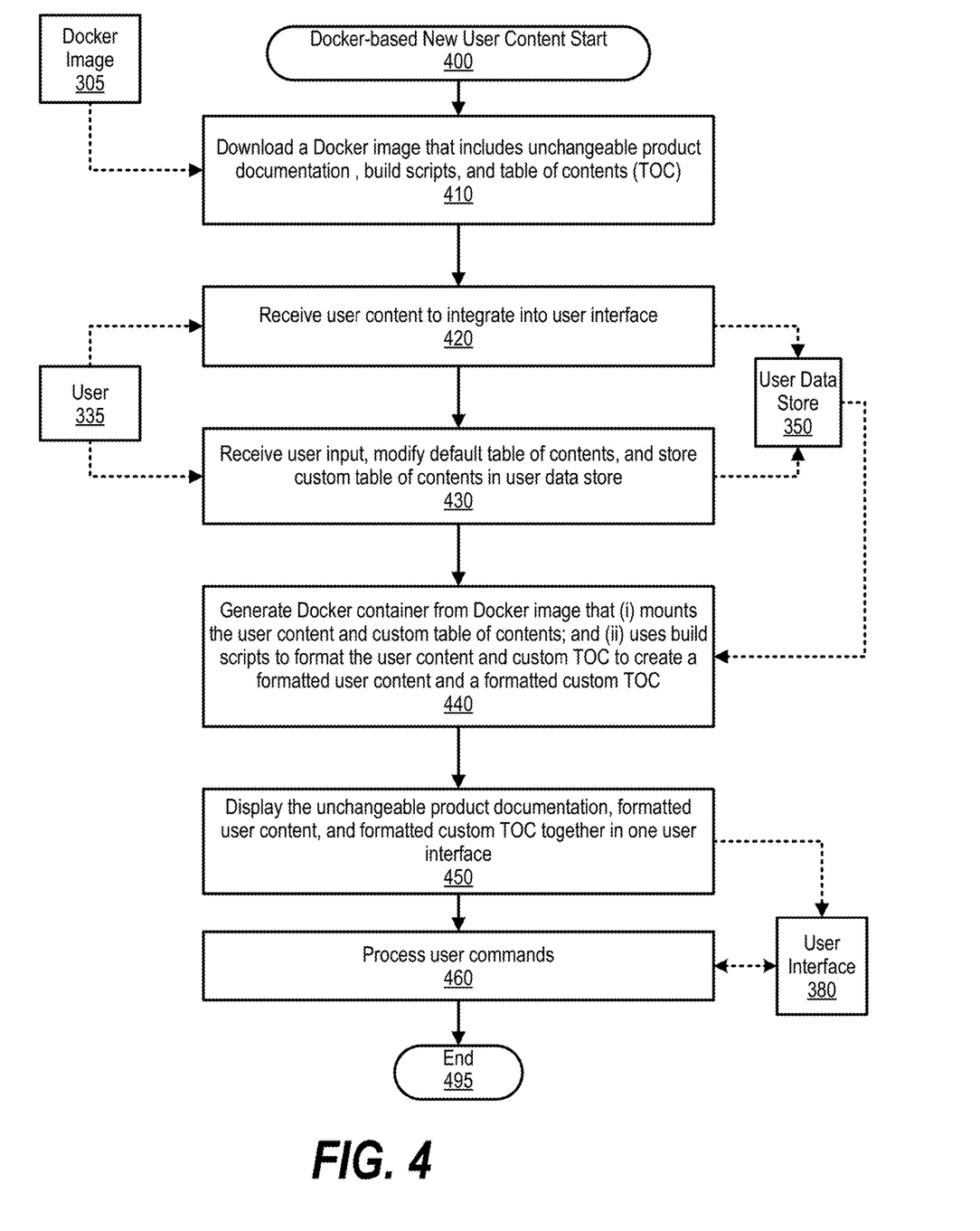
FIG. 4 is an exemplary flowchart showing a Docker-based embodiment of steps taken to intercorporate new user content and a customized table of contents with unchangeable product documentation into a user interface.
Figure 5:
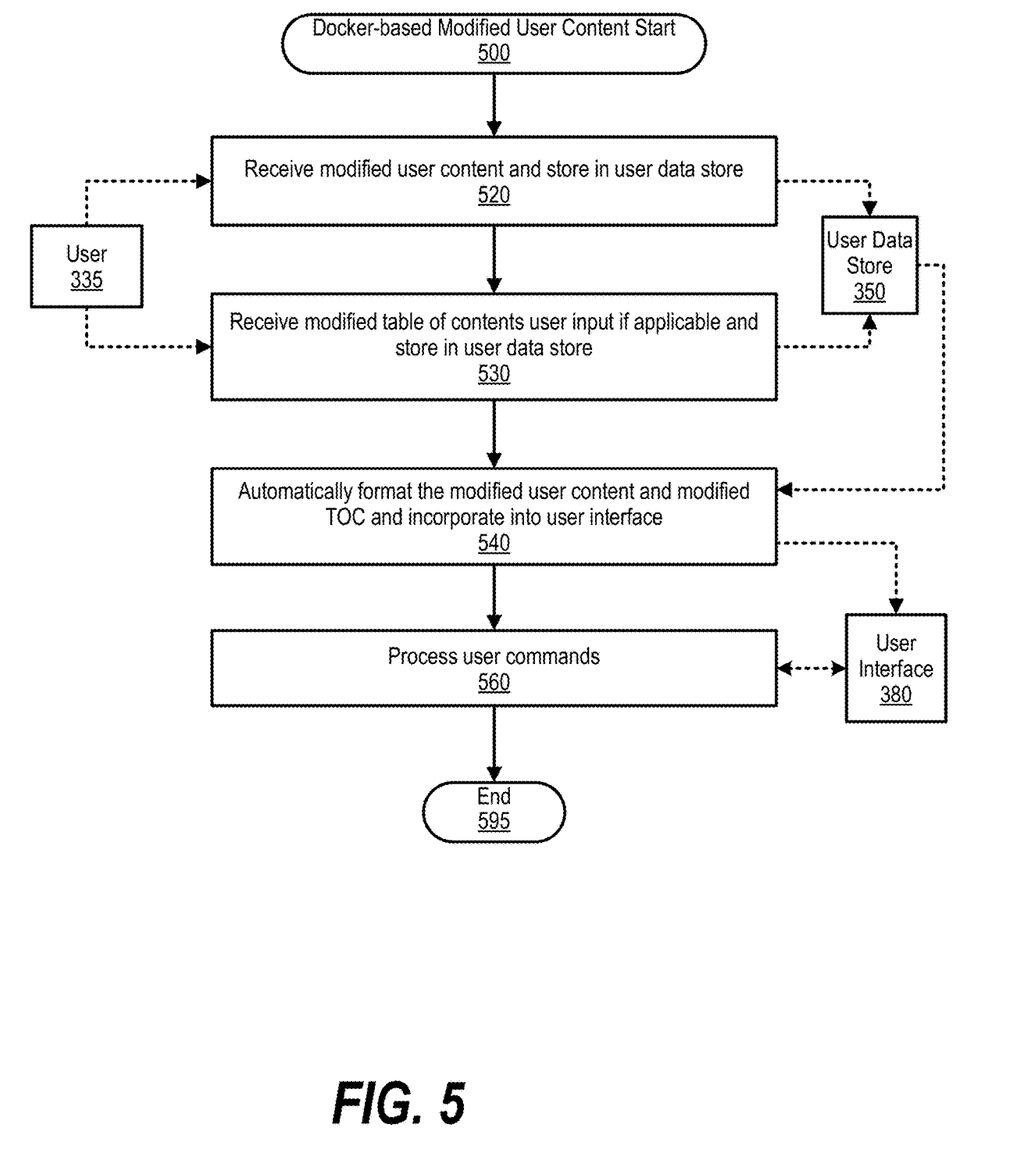
FIG. 5 is an exemplary flowchart showing a Docker-based embodiment of steps taken to receive user content modifications from a user and automatically incorporate the modifications into an established user interface.

FIGS. 3 through 8 depict an approach that can be executed on an information handling system that allow clients to fully integrate their own custom content into a product documentation suite. A product documentation suite, as described herein, includes a set of unchangeable product documentation comprising a set of unchangeable documents generated by a business that is unalterable by a user. FIGS. 3 through 5 discuss a Docker-based embodiment that implements the approach discussed herein and FIGS. 6-7 describe a non-Docker based environment that implements the approach discussed herein.

In one embodiment, the user adds custom user content that includes HTML (hyper-text markup language) and markdown files. In another embodiment, the approach includes steps of running the user specific files through a build process (build scripts) to generate formatted customized files that is compatible with the fully hosted offline product documentation suite.

FIG. 3 is an exemplary diagram showing a computer system using a Docker-based embodiment to create a customized user interface that includes unchangeable product documentation, a formatted user content, and a formatted custom table of contents.

Computer system 325 downloads Docker image 305 from server download system 300 and stores Docker image 305 in data store 328. Docker image 305 includes default table of contents 310, unchangeable product documentation 315, and build scripts 320. Default table of contents 310 corresponds to various documents within unchangeable product documentation 315.

Computer system 325 receives user content 340 from user 335, such as a document describing security procedures, and also user input to modify default TOC 310 into custom TOC 345. In one embodiment, computer system 325 stores default TOC 310 in user data store 350 and user 335 modifies default TOC 310 into custom TOC 345 accordingly, such as by adding a reference to the user 335's security procedures.

Computer system 325 includes Docker engine 330, which builds Docker container 355 from Docker image 305. Docker container 355 is a lightweight, portable, self-sufficient unit that executes on computer system 325 independent of the computer system 325's installed operating system and applications. Docker container 355 provides an additional layer of protection that isolates Docker container 355 from other Docker containers and computer system 325 without using incremental resources of the underlying infrastructure. "Docker" is an example of container technology, which is an open platform to build, ship, and run distributed applications. Organizations utilize Docker to simplify and accelerate their application development and deployment process. In addition to Docker, the approach discussed herein is also suitable for other container technologies.

Docker container 355 includes volume 360, which enables Docker container 355 to mount user content 340 and custom TOC 345. Docker container 355 formats the user data (user content 340 and custom TOC 345) by running user content 340 and custom TOC 345 through build scripts 320 to create formatted custom TOC 370 and formatted user content 375, which are both in a format compatible with unchangeable product documentation 315.

Figure 8:
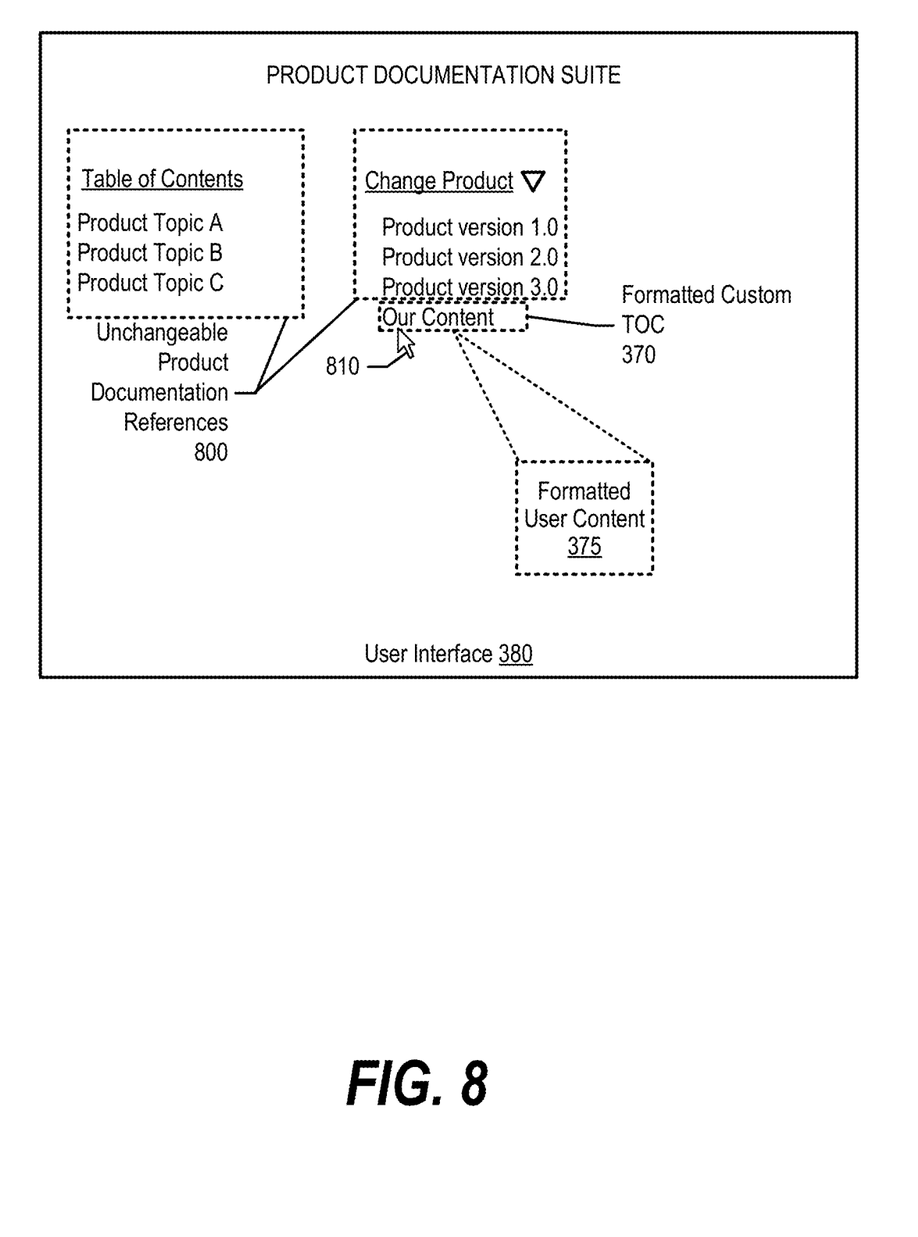
FIG. 8 is an exemplary diagram depicting a user interface that incorporates a set of unchangeable product documentation, a formatted set of user content, and a formatted customized table of contents into a single user interface window.

In turn, Docker container 355 combines unchangeable product documentation 315, formatted user content 375, and formatted custom TOC 370 into user interface 380 that displays, in one embodiment, in a single window on display 130 (see FIG. 8 and corresponding text for further details).

In one embodiment, computer system 325 implements a Helm chart on Docker image 305 to create user interface 380. As discussed above, Docker is a containerization platform and Kubernetes is a container orchestrator for container platforms such as Docker. Helm uses a packaging format referred to as "charts," which are a collection of files that describe a related set of Kubernetes resources. In this embodiment, computer system 325 receives a Helm chart from a Helm chart repository (public or company specific repository) and the Helm chart provides an easy reusable mechanism to deploy unchangeable product documentation 315 with customized content 370 and 375 on Kubernetes. In this embodiment, the Helm chart has options that (i) provide Docker image 305 usage; (ii) Persistent volumes 360 for custom content 370 and 375 to be loaded, and (iii) provide additional options if required by a product documentation suite.

FIG. 4 is an exemplary flowchart showing a Docker-based embodiment of steps taken to intercorporate new user content and a customized table of contents with unchangeable product documentation into a user interface. FIG. 4 processing commences at 400 whereupon, at step 410, the process downloads Docker image 305 that includes a set of unchangeable product documentation 315, default table of contents (TOC) 310, and build scripts 320.

At step 420, the process receives user content 340 from user 335 that the process stores in user data store 350. At step 430, the process modifies default table of contents 310 based on user input and stores custom table of contents 345 in user data store 350.

At step 440, the process generates Docker container 355 from Docker image 305 that mounts user content 340 and custom table of contents 345, and then uses build scripts 320 to format user content 340 and custom table of contents 345 to create formatted user content 375 and formatted custom TOC 370.

At step 450, the process displays unchangeable product documentation 315, formatted user content 375, and formatted custom TOC 370 together in one user interface 380 (see FIG. 8 and corresponding text for further details). At step 460, the process processes user commands on user interface 380 as a whole, such as performing a search command on both unchangeable product documentation 315 and formatted user content 375 in combination. FIG. 4 processing thereafter ends at 495.

FIG. 5 is an exemplary flowchart showing a Docker-based embodiment of steps taken to receive user content modifications from a user and automatically incorporate the modifications into an established user interface. FIG. 5 processing commences at 500 whereupon, at step 520, the process receives a modified set of user content and stores the modified set of user content in user data store 350. For example, user 335 may wish to modify existing user-specific document or add a user document. At step 530, the process receives modified table of contents user input if applicable and stores the modifications in user data store 350.

At step 540, because Docker container 355 includes volumes 360 that point to user data store 350, the process automatically retrieves the modified user data (content and TOC changes), formats the modified user data via build scripts 320, and incorporates the formatted modified user data into user interface 380. At step 560, the process processes user commands and FIG. 5 processing thereafter ends at 595. In one embodiment, the process restarts Docker container 355 to implement new changes as needed.

Figure 6:
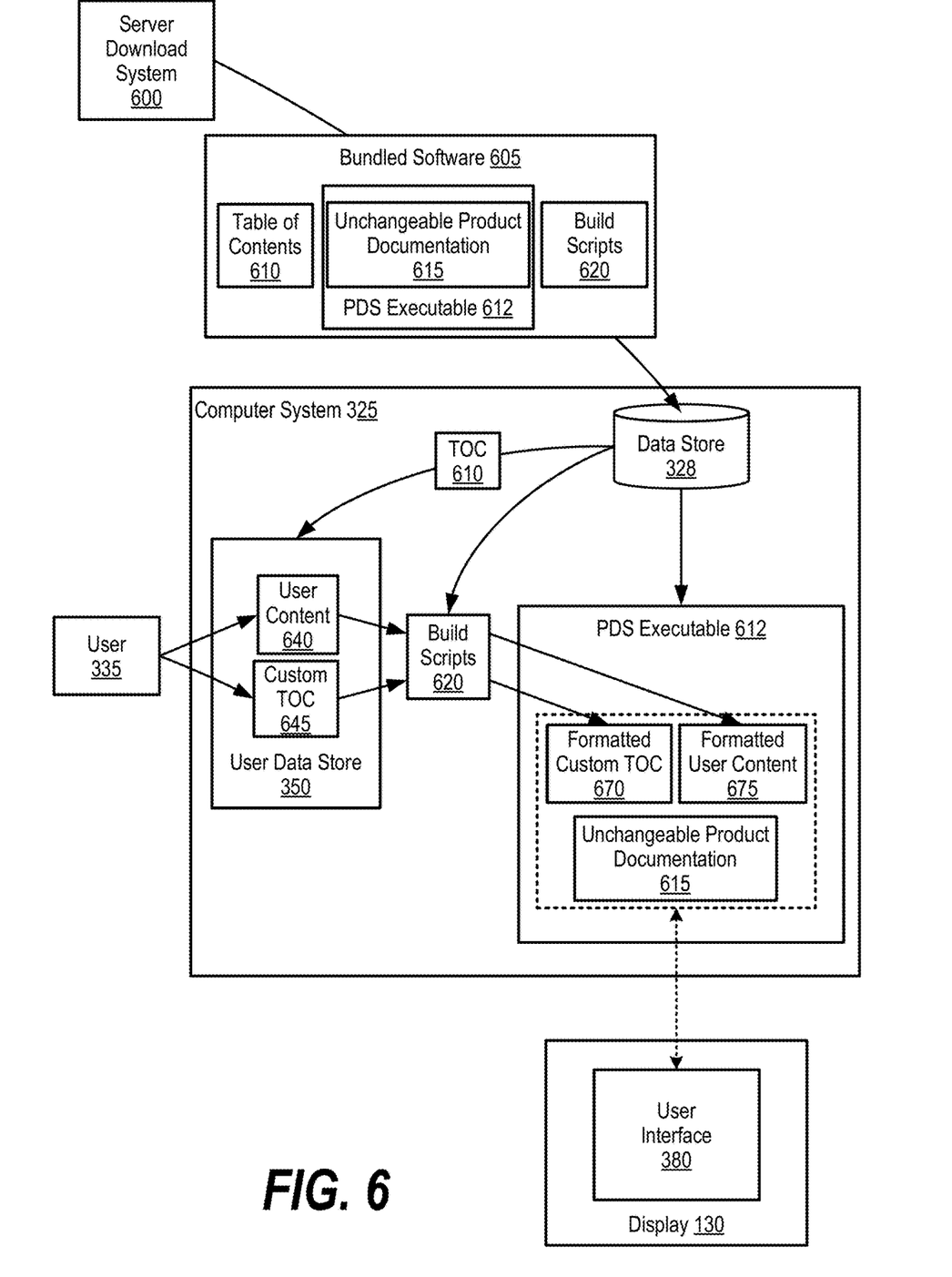
FIG. 6 is an exemplary diagram showing a computer system using a set of bundled software to create a customized user interface that includes a set of unchangeable product documentation, formatted user content, and a formatted custom table of contents.

FIG. 6 is an exemplary diagram showing a computer system using a set of bundled software to create a customized user interface that includes a set of unchangeable product documentation 615, formatted user content 675, and a formatted custom table of contents 670.

Computer system 325 downloads bundled software 605 from server download system 600 and stores bundled software 605 in data store 328. Bundled software 605 includes default table of contents 610, product documentation suite (PDS) executable 612, and build scripts 620. Product documentation suite executable 612 includes unchangeable product documentation 615, which is similar to unchangeable product documentation 315 shown in FIG. 3. Default table of contents 610 corresponds to various documents within unchangeable product documentation 615.

Computer system 325 receives user content 640 from user 335 (e.g., a document describing security procedures) and also receives user input to modify default TOC 610 into custom TOC 645. In one embodiment, computer system 325 stores default TOC 610 in user data store 350 and user 335 modifies default TOC 610 into custom TOC 645 accordingly, such as by adding a reference to the user 335's security procedures documentation. Computer system 325 uses build scripts 620 to format the user data (user content 640 and custom TOC 645) and create formatted custom TOC 670 and formatted user content 675.

Computer system 325 executes product documentation suite executable 612, which captures formatted custom TOC 670 and formatted user content 675. Product documentation suite executable 612 combines unchangeable product documentation 615, formatted user content 675, and formatted custom TOC 670 into user interface 380 that displays, in one embodiment, in a single window on display 130 (see FIG. 8 and corresponding text for further details).

Figure 7:
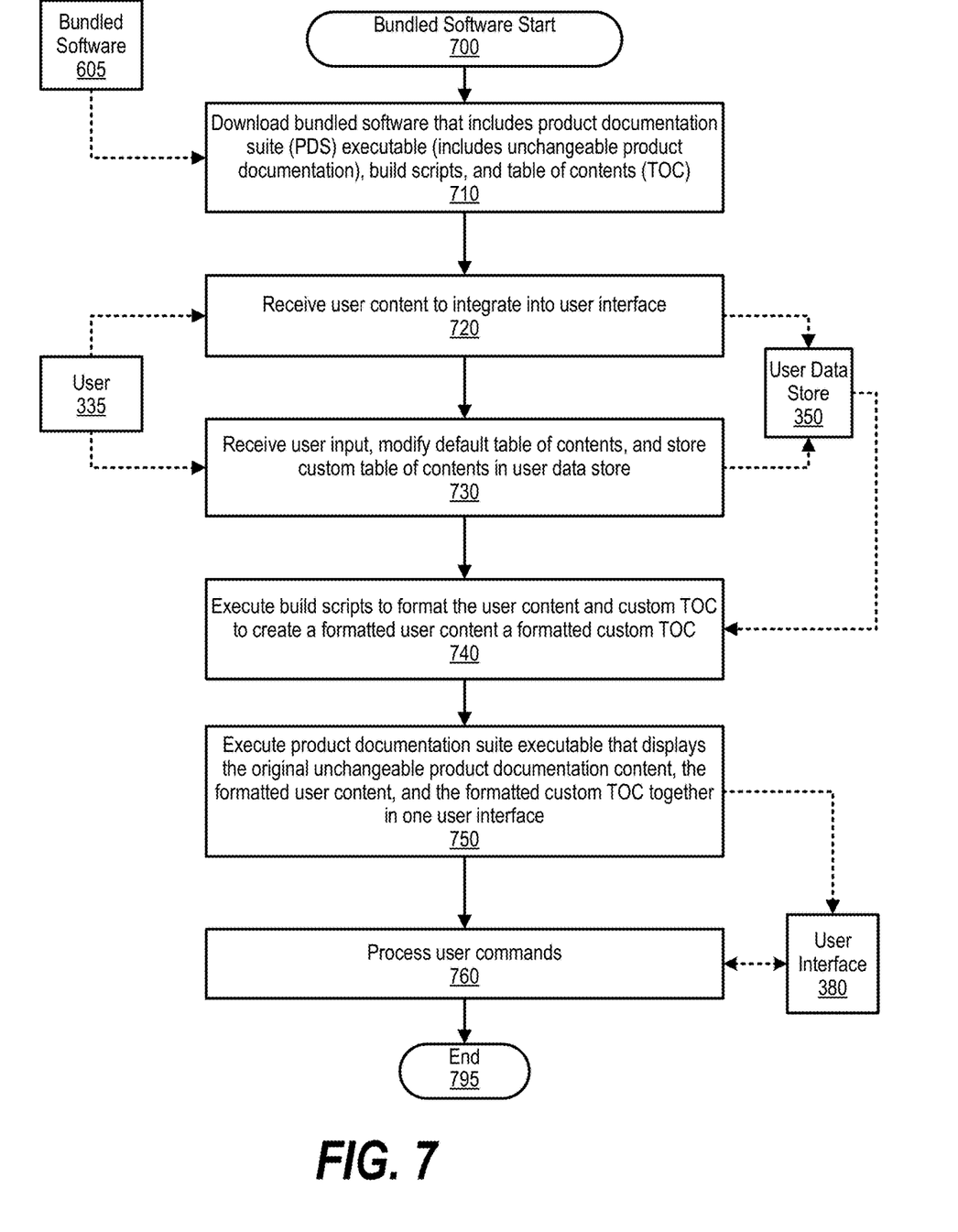
FIG. 7 is an exemplary flowchart showing a non-Docker-based embodiment of steps taken to intercorporate new user content and a customized table of contents with unchangeable product documentation into a user interface.

FIG. 7 is an exemplary flowchart showing a non-Docker-based embodiment of steps taken to intercorporate new user content and a customized table of contents with unchangeable product documentation into a user interface. FIG. 7 processing commences at 700 whereupon, at step 710, the process downloads bundled software 605 that includes product documentation suite executable 612, (includes unchangeable product documentation 615), build scripts 620, and default table of contents (TOC) 610.

At step 720, the process receives user content 640 from user 335 that the process stores in user data store 350. At step 730, the process modifies the default table of contents 610 based on user input and stores custom table of contents 645 in user data store 350.

At step 740, the process executes build scripts 620 to format user content 640 and custom TOC 645 to create a formatted set of user content 675 a formatted custom TOC 670. At step 750, the process executes documentation suite executable 612 that displays the original set of unchangeable product documentation 615, the formatted set of user content 675, and the formatted custom TOC 670 together in one user interface 380. At step 760, the process processes user commands and FIG. 7 processing thereafter ends at 795. In one embodiment, implementing user modifications in the bundled software embodiment shown in FIGS. 6 and 7 may be similar to the Docker embodiment shown in FIGS. 3-5 by monitoring specific directory/data storage areas for changes or restarting product documentation suite executable 612 bring in modified user content.

FIG. 8 is an exemplary diagram depicting a user interface that incorporates a set of unchangeable product documentation, a formatted set of user content, and a formatted customized table of contents into a single user interface window.

User interface 380 includes unchangeable product documentation references 800 that, when selected by user 335 (via pointer 810), user interface 380 displays the corresponding set of unchangeable product documentation 315 or 615.

In addition, user interface 380 also includes formatted custom table of contents 370 (or 670), which includes a user content reference that allows user 335 to select (via pointer 810) and display formatted user content 375 or 675 using a single user interface 380.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   downloading a Docker image comprising a set of build scripts and a set of unchangeable product documentation corresponding to a product, wherein the set of unchangeable product documentation is unalterable by a user and comprises a default table of contents;
   creating a Docker container from the Docker image that comprises the set of unchangeable product documentation and the set of build scripts;
   receiving, from the user, a set of user content that comprises a custom table of contents;
   executing the set of build scripts from the Docker container, wherein the executing further comprises:
      converting the set of user content into a formatted set of user content that is in a format compatible with the set of unchangeable product documentation; and
      creating a formatted custom table of contents based on the default table of contents and the custom table of contents;
   running the Docker container to generate a user interface that comprises the set of unchangeable product documentation, the formatted custom table of contents, and the formatted set of user content; and
   displaying the user interface on a display.

2. The method of claim 1 wherein the set of unchangeable product documentation and the user interface correspond to a fully hosted offline product documentation suite.

3. The method of claim 1 further comprising:
   modifying the set of user content based on a set of modifications received from the user, resulting in a modified set of user content;
   automatically re-executing, from the Docker container, the set of build scripts on the modified set of user content to generate a formatted modified set of user content; and automatically replacing the formatted set of user content with the formatted modified set of user content in the user interface.

4. The method of claim 1 further comprising:
downloading a set of bundled software comprising a product documentation executable program and the set of build scripts, wherein the product documentation executable program includes the set of unchangeable product documentation; and
executing the product document executable program to generate the user interface that displays the set of unchangeable product documentation, the formatted custom table of contents, and the formatted set of user content.

5. The method of claim 1 further comprising:
converting a set of different user content received from a different user into the format compatible with the set of unchangeable product documentation;
integrating the formatted set of different user content with the set of unchangeable product documentation into a different user interface; and
displaying the different user interface to the different user on the display.

6. An information handling system comprising:
one or more processors;
a memory coupled to at least one of the processors;
a set of computer program instructions stored in the memory and executed by at least one of the processors in order to perform actions of:
downloading a Docker image comprising a set of build scripts and a set of unchangeable product documentation corresponding to a product, wherein the set of unchangeable product documentation is unalterable by a user and comprises a default table of contents;
creating a Docker container from the Docker image that comprises the set of unchangeable product documentation and the set of build scripts;
receiving, from the user, a set of user content that comprises a custom table of contents;
executing the set of build scripts from the Docker container, wherein the executing further comprises:
converting the set of user content into a formatted set of user content that is in a format compatible with the set of unchangeable product documentation; and
creating a formatted custom table of contents based on the default table of contents and the custom table of contents;
running the Docker container to generate a user interface that comprises the set of unchangeable product documentation, the formatted custom table of contents, and the formatted set of user content; and
displaying the user interface on a display.

7. The information handling system of claim 6 wherein the set of unchangeable product documentation and the user interface correspond to a fully hosted offline product documentation suite.

8. The information handling system of claim 6 wherein the processors perform additional actions comprising:
modifying the set of user content based on a set of modifications received from the user, resulting in a modified set of user content;
automatically re-executing, from the Docker container, the set of build scripts on the modified set of user content to generate a formatted modified set of user content; and automatically replacing the formatted set of user content with the formatted modified set of user content in the user interface.

9. The information handling system of claim 6 wherein the processors perform additional actions comprising:
downloading a set of bundled software comprising a product documentation executable program and the set of build scripts, wherein the product documentation executable program includes the set of unchangeable product documentation; and
executing the product document executable program to generate the user interface that displays the set of unchangeable product documentation, the formatted custom table of contents, and the formatted set of user content.

10. The information handling system of claim 6 wherein the processors perform additional actions comprising:
converting a set of different user content received from a different user into the format compatible with the set of unchangeable product documentation;
integrating the formatted set of different user content with the set of unchangeable product documentation into a different user interface; and
displaying the different user interface to the different user on the display.

11. A computer program product stored in a computer readable storage medium, comprising computer program code that, when executed by an information handling system, causes the information handling system to perform actions comprising:
downloading a Docker image comprising a set of build scripts and a set of unchangeable product documentation corresponding to a product, wherein the set of unchangeable product documentation is unalterable by a user and comprises a default table of contents;
creating a Docker container from the Docker image that comprises the set of unchangeable product documentation and the set of build scripts;
receiving, from the user, a set of user content that comprises a custom table of contents;
executing the set of build scripts from the Docker container, wherein the executing further comprises:
converting the set of user content into a formatted set of user content that is in a format compatible with the set of unchangeable product documentation; and
creating a formatted custom table of contents based on the default table of contents and the custom table of contents;
running the Docker container to generate a user interface that comprises the set of unchangeable product documentation, the formatted custom table of contents, and the formatted set of user content; and
displaying the user interface on a display.

12. The computer program product of claim 11 wherein the set of unchangeable product documentation and the user interface correspond to a fully hosted offline product documentation suite.

13. The computer program product of claim 11 wherein the information handling system performs further actions comprising:
modifying the set of user content based on a set of modifications received from the user, resulting in a modified set of user content;
automatically re-executing, from the Docker container, the set of build scripts on the modified set of user content to generate a formatted modified set of user content; and automatically replacing the formatted set of user content with the formatted modified set of user content in the user interface.

14. The computer program product of claim 11 wherein the information handling system performs further actions comprising:
  downloading a set of bundled software comprising a product documentation executable program and the set of build scripts, wherein the product documentation executable program includes the set of unchangeable product documentation; and
  executing the product document executable program to generate the user interface that displays the set of unchangeable product documentation, the formatted custom table of contents, and the formatted set of user content.

* * * * *